US008561075B2

(12) United States Patent
Blanck et al.

(10) Patent No.: US 8,561,075 B2
(45) Date of Patent: Oct. 15, 2013

(54) LOAD BALANCING SERVERS

(75) Inventors: Lucas F. Blanck, Raleigh, NC (US); Charles A. Cole, Cary, NC (US); Clark A. Dudek, Raleigh, NC (US); Kobina K. Inkumsah, Lansing, MI (US); Phillip D. Jones, Raleigh, NC (US); David B. Roberts, Cary, NC (US); Adrian X. Rodriguez, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 29 days.

(21) Appl. No.: 13/287,453

(22) Filed: Nov. 2, 2011

(65) Prior Publication Data

US 2013/0111495 A1    May 2, 2013

(51) Int. Cl.
    *G06F 9/46* (2006.01)
(52) U.S. Cl.
    USPC .......................................... 718/103; 718/105
(58) Field of Classification Search
    None
    See application file for complete search history.

(56) References Cited

U.S. PATENT DOCUMENTS

| 7,676,280 | B1 * | 3/2010 | Bash et al. ................... 700/17 |
| 8,041,521 | B2 * | 10/2011 | Bletsch et al. ............... 702/60 |
| 2003/0046339 | A1 | 3/2003 | Ip |
| 2006/0171538 | A1 * | 8/2006 | Larson et al. ............... 380/270 |
| 2007/0089446 | A1 * | 4/2007 | Larson et al. .............. 62/259.2 |
| 2008/0304229 | A1 * | 12/2008 | June et al. .................... 361/687 |
| 2009/0077478 | A1 * | 3/2009 | Gillingham et al. ......... 715/763 |
| 2009/0249862 | A1 * | 10/2009 | Glover et al. ................ 73/30.04 |
| 2009/0319650 | A1 * | 12/2009 | Collins et al. ............... 709/223 |
| 2010/0169470 | A1 * | 7/2010 | Takashige et al. ........... 709/223 |
| 2010/0217454 | A1 * | 8/2010 | Spiers et al. ................. 700/300 |
| 2010/0275110 | A1 | 10/2010 | Frid-Nielsen et al. |
| 2011/0055605 | A1 | 3/2011 | Jackson |
| 2011/0107332 | A1 | 5/2011 | Bash |
| 2012/0105475 | A1 * | 5/2012 | Tseng ........................... 345/633 |

FOREIGN PATENT DOCUMENTS

| CN | 101557344 A | 10/2009 |
| EP | 1180886 A1 | 2/2002 |

OTHER PUBLICATIONS

Nidito et al., "Fault-Tolerant and Load Balancing Localization of Services in Wireless Sensor Networks", in IEEE 66th Vehicular Technology Conference (VTC-2007), Sep.-Oct. 2007, pp. 382-386, Digital Object Identifier : 10.1109/VETECF.2007.92, IEEE Computer Society, USA.

* cited by examiner

*Primary Examiner* — Emerson Puente
*Assistant Examiner* — Dong Kim
(74) *Attorney, Agent, or Firm* — H. Barrett Spraggins; Cynthia G. Seal; Biggers & Ohanian, LLP

(57) ABSTRACT

Methods, apparatuses, and computer program products for load balancing servers are provided. Embodiments include determining, by a balance module, for each server within a rack comprising a plurality of servers, a vertical position of the server relative to the other servers within the rack; selecting from the plurality of servers, by the balance module, based on the determined vertical positions of the servers, a particular server to assign a workload; and assigning, by the balance module, the workload to the selected server.

18 Claims, 10 Drawing Sheets

LOAD BALANCING SERVERS

BACKGROUND OF THE INVENTION

1. Field of the Invention

The field of the invention is data processing, or, more specifically, methods, apparatuses, and computer program products for load balancing servers.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of computer software development is in the management and balancing of server workloads. In a computer network, a workload may be distributed across multiple computers, a computer cluster, network links, central processing units, disk drives, or other resources, to achieve optimal resource utilization, maximize throughput, minimize response time, and avoid overload. Another consideration for determining workload distribution is energy consumption. For example, in a data center with hundreds or even thousands of servers, the workload assignments may have a significant impact on which servers are cooled, how they are cooled, and the overall energy consumption of the air conditioning units cooling the servers. Therefore, balancing workload assignments among servers is an important area for controlling the costs associated with operating servers.

SUMMARY OF THE INVENTION

Methods, apparatuses, and computer program products for load balancing servers are provided. Embodiments include determining, by a balance module, for each server within a rack comprising a plurality of servers, a vertical position of the server relative to the other servers within the rack; selecting from the plurality of servers, by the balance module, based on the determined vertical positions of the servers, a particular server to assign a workload; and assigning, by the balance module, the workload to the selected server.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
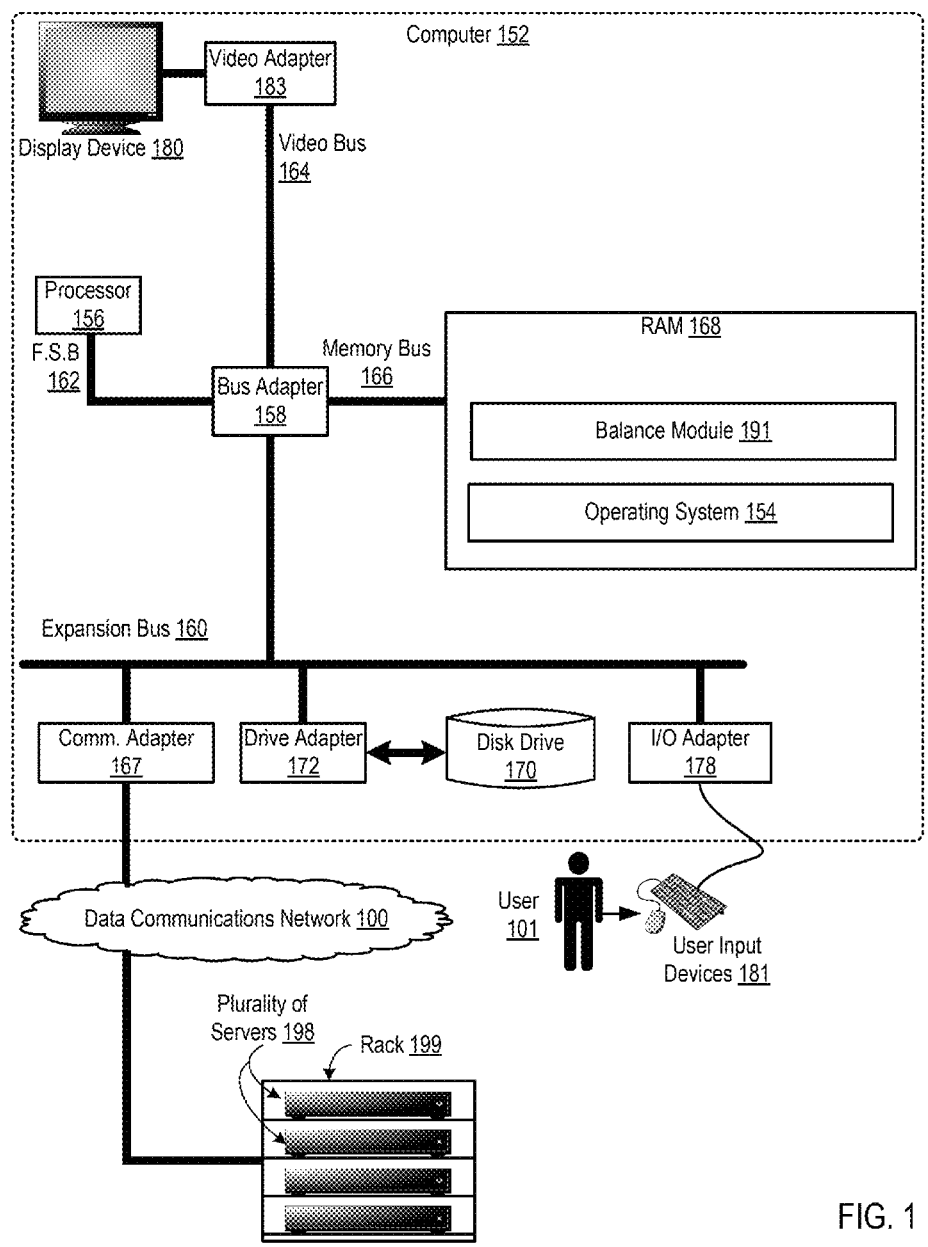
FIG. 1 sets forth a block diagram of automated computing machinery comprising an exemplary computer useful in load balancing servers according to embodiments of the present invention.

Exemplary methods, apparatuses, and computer program products for load balancing servers in accordance with the present invention are described with reference to the accompanying drawings, beginning with FIG. 1. Load balancing servers in accordance with the present invention is generally implemented with computers, that is, with automated computing machinery. FIG. 1 sets forth a block diagram of automated computing machinery comprising an exemplary computer (152) useful in load balancing servers according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a balance module (191) for load balancing servers according to embodiments of the present invention. Specifically, the balance module (191) includes computer program instructions that when executed by the computer processor (156) cause the computer (152) to carry out the steps of: determining, by the balance module (191), for each server within a rack (199) comprising a plurality of servers (198), a vertical position of the server relative to the other servers within the rack (199). A vertical position is an indication of the position of the server within the rack (199) relative to the other servers (198) within the rack (199). For example, in a rack that includes four servers stacked vertically on top of each other, the server on the bottom of the stack may be assigned a first vertical position and the server on the top of the stack may be assigned a fourth vertical position.

The balance module (191 may also include computer program instructions that when executed by the computer processor (156) cause the computer (152) to carry out the steps of: selecting from the plurality of servers (198), by the balance module (191), based on the determined vertical positions of the servers (198), a particular server to assign a workload; and assigning, by the balance module (191), the workload to the selected server. That is, workload is assigned based on positions of the servers within a rack. Because hot air rises, a server located in the bottom of a rack may be easier to cool than a server located in the top of a rack. Therefore, it would take more energy to process the workload at the server at the top of the rack than the server at the bottom of the rack because the air temperature may be 1 or 2 degrees hotter at the top of the rack. Thus, load balancing servers according to embodiments of the present invention may reduce energy consumption.

Also stored in RAM (168) is an operating system (154). Operating systems useful image compression according to embodiments of the present invention include UNIX™, Linux™, Microsoft 7™, AIX™, IBM's i5/OS™, iOS™, Android™, and others as will occur to those of skill in the art. The operating system (154) and the balance module (191) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for load balancing servers according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art. The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (183), which is an example of an I/O adapter spatially designed for graphic output to a display device (180) such as a display screen or computer monitor. Video adapter (183) is connected to processor (156) through a high speed video bus (164), bus adapter (158), and the front side bus (162), which is also a high speed bus.

The exemplary computer (152) of FIG. 1 includes a communications adapter (167) for data communications with a data communications network (100) and with other computers, such as the plurality of servers (198). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for load balancing servers according to embodiments of the present invention include modems for wired dial-up communications, Ethernet (IEEE 802.3) adapters for wired data communications network communications, and 802.11 adapters for wireless data communications network communications.

Figure 2:
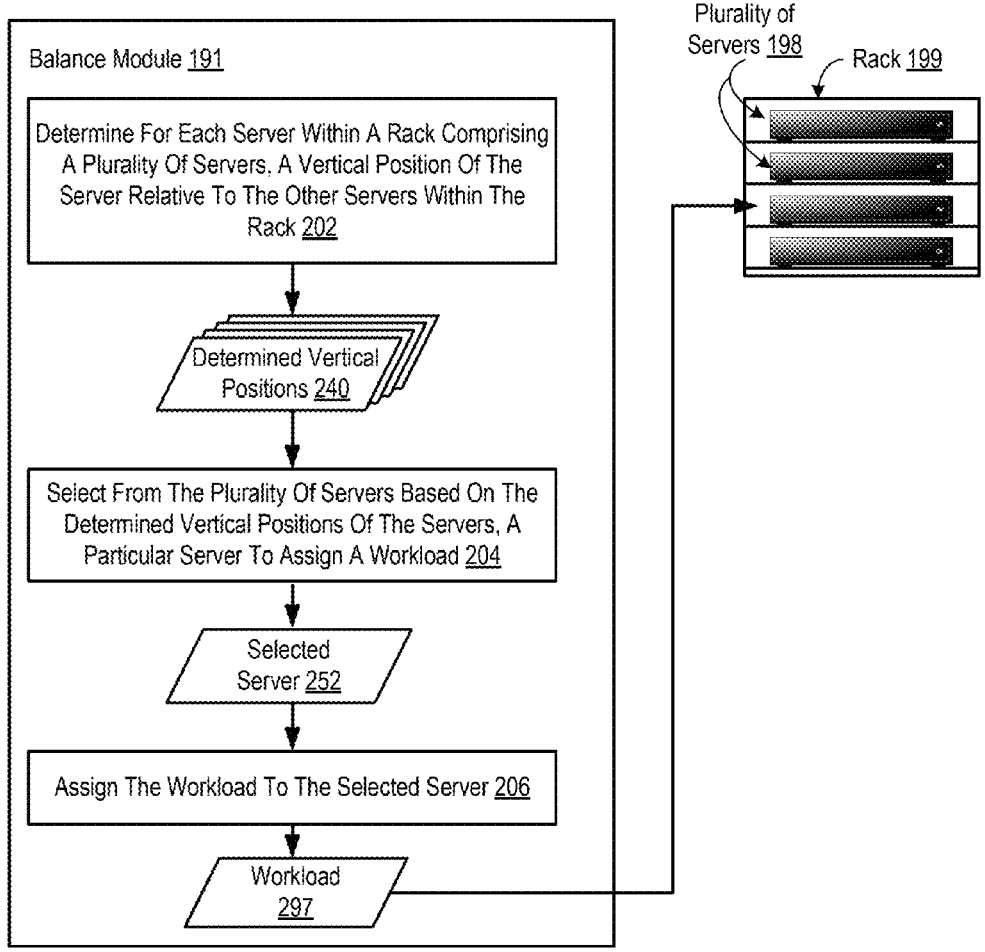
FIG. 2 sets forth a flow chart illustrating an exemplary method for load balancing servers according to embodiments of the present invention.

For further explanation, FIG. 2 sets forth a flow chart illustrating an exemplary method for load balancing servers according to embodiments of the present invention. The method of FIG. 2 includes determining (202), by a balance module (191), for each server within a rack (199) comprising a plurality of servers (198), a vertical position (240) of the server relative to the other servers within the rack (199). A vertical position is an indication of the position of the server within the rack (199) relative to the other servers (198) within the rack (199). For example, in a rack that includes four servers stacked vertically, the server on the bottom of the stack may be assigned a first vertical position and the server on the top of the stack may be assigned a fourth vertical position. Determining (202) for each server within a rack (199) comprising a plurality of servers (198), a vertical position (240) of the server relative to the other servers within the rack (199) may be carried out by receiving information from one or more sources that indicate the positioning of the servers relative to each other; using the information to assign a vertical position to each server; and storing the determined vertical location of each server within the balance module (191.

The method of FIG. 2 also includes selecting (204) from the plurality of servers (198), by the balance module (191), based on the determined vertical positions (240) of the servers (198), a particular server (252) to assign a workload (297). A workload is a collection of one or more processing tasks to be performed at a server. Selecting (204) from the plurality of servers (198) based on the determined vertical positions (240) of the servers (198), a particular server (252) to assign a workload (297) may be carried out by identifying an available server with the lowest vertical position; and assigning the workload to the identified server. In this example, the lowest vertical position would indicate the server closest to the bottom of the rack. Alternatively, the balance module (191) may use an algorithm to determine which server to assign the workload and the algorithm may take into account utilization information, affinity information, and other power management considerations in addition to the vertical positions of the servers. In addition, the balance module (191) may be configured to monitor and balance servers in multiple racks. That is, the balance module (191) may select a particular server from a plurality of racks.

The method of FIG. 2 includes assigning (206), by the balance module (191), the workload (297) to the selected server (252). Assigning (206) the workload (297) to the selected server (252) may be carried out by storing an indication of the assignment within the balance module; and transmitting data associated with the workload to the selected server.

Figure 3:
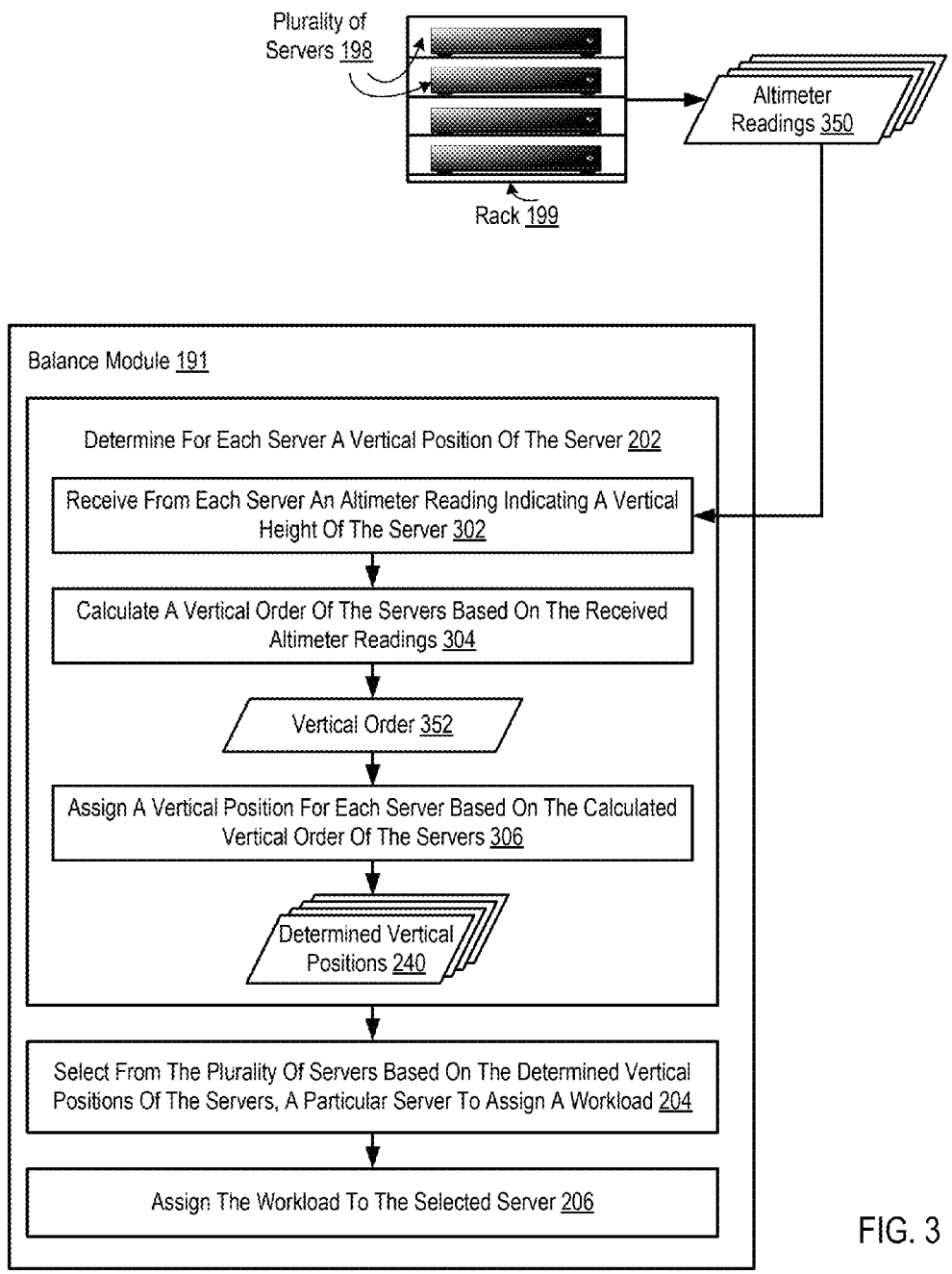
FIG. 3 sets forth a flow chart illustrating a further exemplary method for load balancing servers according to embodiments of the present invention.

For further explanation, FIG. 3 sets forth a flow chart illustrating a further exemplary method for load balancing servers according to embodiments of the present invention. The method of FIG. 3 is similar to the method of FIG. 2 in that the method of FIG. 3 also includes: determining (202) for each server within a rack (199) comprising a plurality of servers (198), a vertical position (240) of the server relative to the other servers within the rack (199); selecting (204) from the plurality of servers (198) based on the determined vertical positions (240) of the servers (198), a particular server (252) to assign a workload (297); and assigning (206) the workload (297) to the selected server (252).

In the method of FIG. 3, however, determining (202) for each server within a rack (199) a vertical position (240) of the server relative to the other servers within the rack (199) includes receiving (302) from each server, by the balance module (191), an altimeter reading (350) indicating a vertical height of the server. Each server may include an altimeter that generates altimeter readings. An altimeter is an instrument used to measure the altitude of an object above a fixed level.

Each server may also include automated computer machinery to transmit the altimeter reading to the balance module (191). Receiving (302) from each server an altimeter reading (350) indicating a vertical height of the server may be carried out by establishing a connection between the balance module and one or more servers within the rack; and receiving a message from the rack that includes the altimeter reading.

In the method of FIG. 3, determining (202) for each server within a rack (199) a vertical position (240) of the server relative to the other servers within the rack (199) includes calculating (304), by the balance module (191), a vertical order (352) of the servers (198) based on the received altimeter readings (350). A vertical order is a data structure that specifies an order the servers are stacked within a rack. Calculating (304) a vertical order (352) of the servers (198) based on the received altimeter readings (350) may be carried out by comparing the received altimeter readings; sorting the received altimeter readings based on height from a shared reference point, such as the ground; creating a list of the servers in an order based on the servers correspondence with the sorted altimeter readings; and storing the list as the vertical order.

In the method of FIG. 3, determining (202) for each server within a rack (199) a vertical position (240) of the server relative to the other servers within the rack (199) includes assigning (306), by the balance module (191), a vertical position (240) for each server based on the calculated vertical order (352) of the servers (198). Assigning (306) a vertical position (240) for each server based on the calculated vertical order (352) of the servers (198) may be carried out by determining for each server, the server's position within the vertical order; and storing the determined position within the vertical order as the determined vertical position of the server.

Figure 4:
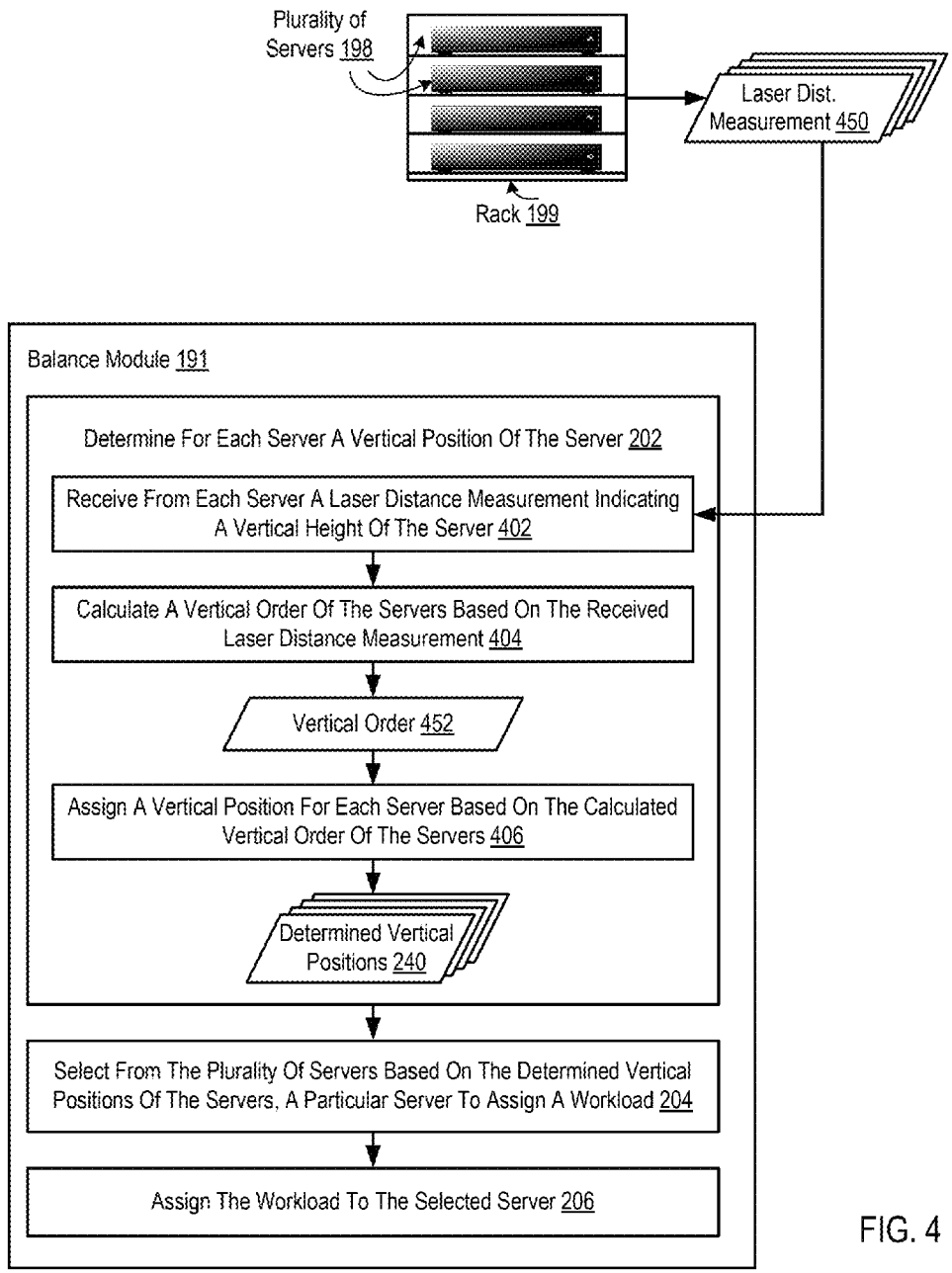
FIG. 4 sets forth a flow chart illustrating a further exemplary method for load balancing servers according to embodiments of the present invention.

For further explanation, FIG. 4 sets forth a flow chart illustrating a further exemplary method for load balancing servers according to embodiments of the present invention. The method of FIG. 4 is similar to the method of FIG. 2 in that the method of FIG. 4 also includes: determining (202) for each server within a rack (199) comprising a plurality of servers (198), a vertical position (240) of the server relative to the other servers within the rack (199); selecting (204) from the plurality of servers (198) based on the determined vertical positions (240) of the servers (198), a particular server (252) to assign a workload (297); and assigning (206) the workload (297) to the selected server (252).

In the method of FIG. 4, however, determining (202) for each server within a rack (199) a vertical position (240) of the server relative to the other servers within the rack (199) includes receiving (402) from each server, by the balance module (191), a laser distance measurement (450) indicating a vertical height of the server. Each server may include a laser distance calculator. A laser distance calculator is an instrument that uses a laser to calculate a distance between the laser distance calculator and a reference object. For example, each server may use a laser distance calculator to determine the distance between the server and the ground or the bottom of a server rack. Receiving (402) from each server a laser distance measurement (450) indicating a vertical height of the server may be carried out by establishing a connection between the balance module and one or more servers within the rack; and receiving a message from the rack that includes the laser distance measurement.

In the method of FIG. 4, determining (202) for each server within a rack (199) a vertical position (240) of the server relative to the other servers within the rack (199) includes calculating (404), by the balance module (191), a vertical order (452) of the servers (198) based on the received laser distance measurements (450). Calculating (404) a vertical order (452) of the servers (198) based on the received laser distance measurements (450) may be carried out by comparing the received laser distance measurements; sorting the received laser distance measurements based on height from a shared reference point, such as the ground; creating a list of the servers in an order based on the servers correspondence with the sorted laser distance measurements; and storing the list as the vertical order.

In the method of FIG. 4, determining (202) for each server within a rack (199) a vertical position (240) of the server relative to the other servers within the rack (199) includes assigning (406), by the balance module (191), a vertical position (240) for each server based on the calculated vertical order (452) of the servers (198). Assigning (406) a vertical position (240) for each server based on the calculated vertical order (452) of the servers (198) may be carried out by determining for each server, the server's position within the vertical order; and storing the determined position within the vertical order as the determined vertical position of the server.

Figure 5:
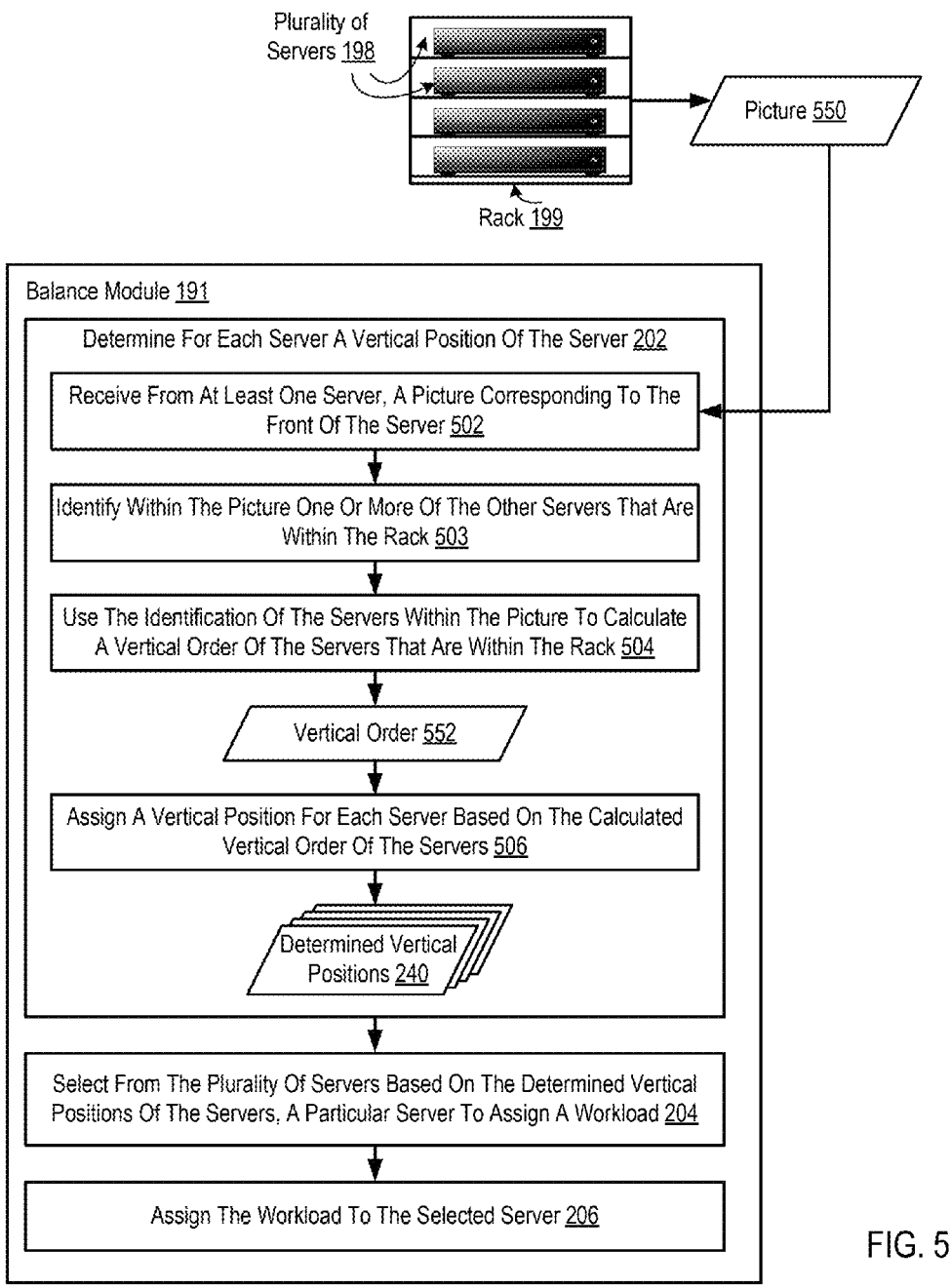
FIG. 5 sets forth a flow chart illustrating a further exemplary method for load balancing servers according to embodiments of the present invention.

For further explanation, FIG. 5 sets forth a flow chart illustrating a further exemplary method for load balancing servers according to embodiments of the present invention. The method of FIG. 5 is similar to the method of FIG. 2 in that the method of FIG. 5 also includes: determining (202) for each server within a rack (199) comprising a plurality of servers (198), a vertical position (240) of the server relative to the other servers within the rack (199); selecting (204) from the plurality of servers (198) based on the determined vertical positions (240) of the servers (198), a particular server (252) to assign a workload (297); and assigning (206) the workload (297) to the selected server (252).

In the method of FIG. 5, however, determining (202) for each server within a rack (199) a vertical position (240) of the server relative to the other servers within the rack (199) includes receiving (502) from at least one server, by the balance module (191), a picture (550) corresponding to the front of the server. Each server may include a camera that captures images of the front of the server. The pictures captured by the server camera may also include portions of other servers. Each server may also include automated computer machinery to transmit a picture to the balance module (191). Receiving (502) from at least one server, a picture (550) corresponding to the front of the server may be carried out by establishing a connection between the balance module and one or more servers within the rack; and receiving a message from the rack that includes the picture.

In the method of FIG. 5, determining (202) for each server within a rack (199) a vertical position (240) of the server relative to the other servers within the rack (199) includes identifying (503), by the balance module (191), within the picture (550), one or more of the other servers (198) that are within the rack (199). Identifying (503) within the picture (550), one or more of the other servers (198) that are within the rack (199) may be carried out by examining the picture for identifying characteristics of the servers; and corresponding the identified characteristics with servers. That is, the picture from the front of a particular server may be used to identify other servers.

In the method of FIG. 5, determining (202) for each server within a rack (199) a vertical position (240) of the server relative to the other servers within the rack (199) includes using (504), by the balance module (191), the identification of the servers (198) within the picture (550) to calculate a vertical order (552) of the servers (198) that are within the rack (199). Using (504) the identification of the servers (198) within the picture (550) to calculate a vertical order (552) of the servers (198) that are within the rack (199) may be carried out by for each picture, determining an order of identified servers within the picture; combining the information from other pictures to determine a complete vertical arrangement of the servers; creating a list of the servers in an order based on the servers correspondence with the determined complete vertical arrangement; and storing the list as the vertical order.

In the method of FIG. 5, determining (202) for each server within a rack (199) a vertical position (240) of the server relative to the other servers within the rack (199) includes assigning (506), by the balance module (191), a vertical position (552) for each server based on the calculated vertical order (552) of the servers (198). Assigning (506) a vertical position (240) for each server based on the calculated vertical order (552) of the servers (198) may be carried out by determining for each server, the server's position within the vertical order; and storing the determined position within the vertical order as the determined vertical position of the server.

Figure 6:
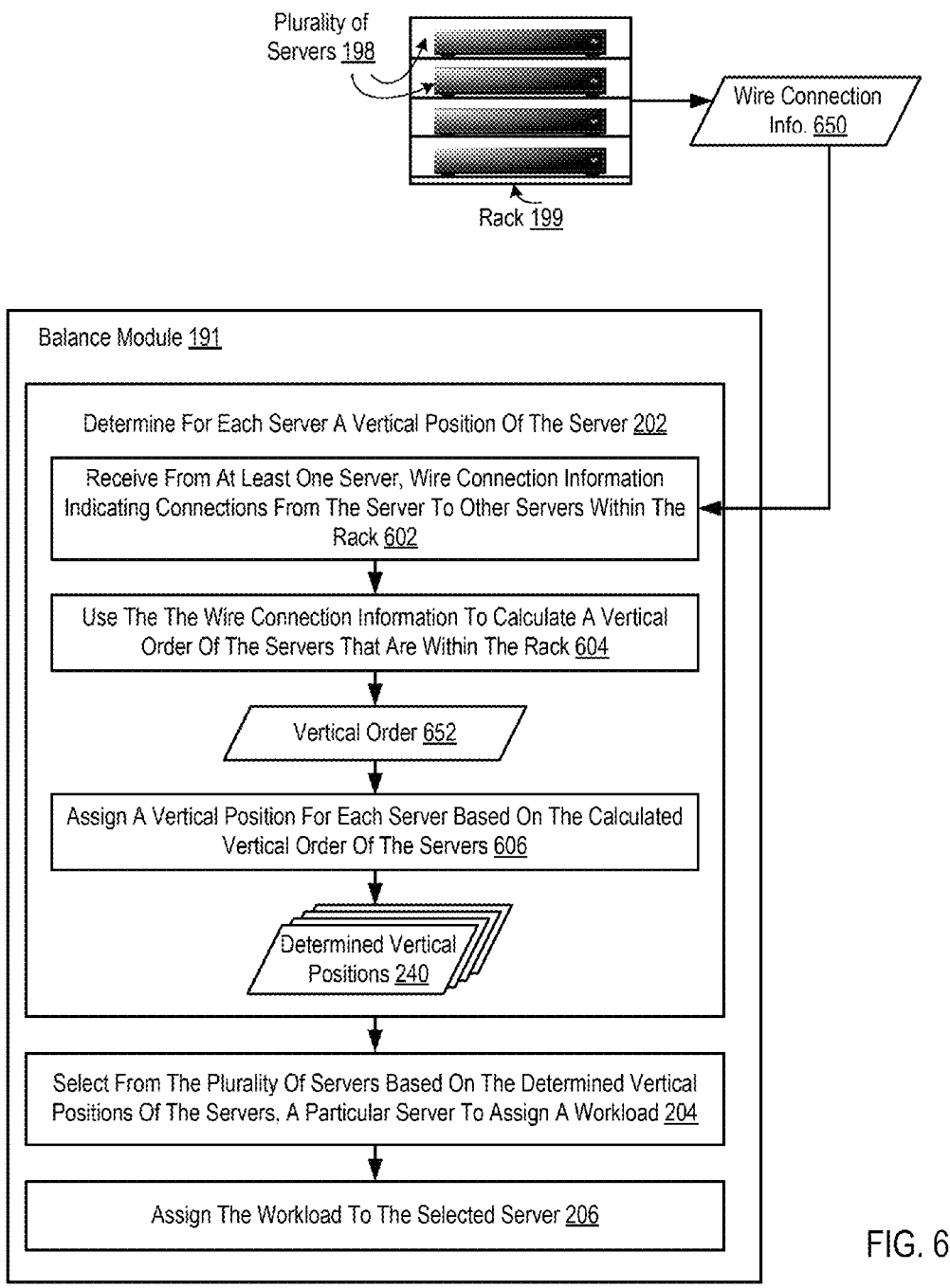
FIG. 6 sets forth a flow chart illustrating a further exemplary method for load balancing servers according to embodiments of the present invention.

For further explanation, FIG. 6 sets forth a flow chart illustrating a further exemplary method for load balancing servers according to embodiments of the present invention. The method of FIG. 6 is similar to the method of FIG. 2 in that the method of FIG. 6 also includes: determining (202) for each server within a rack (199) comprising a plurality of servers (198), a vertical position (240) of the server relative to the other servers within the rack (199); selecting (204) from the plurality of servers (198) based on the determined vertical positions (240) of the servers (198), a particular server (252) to assign a workload (297); and assigning (206) the workload (297) to the selected server (252).

In the method of FIG. 6, however, determining (202) for each server within a rack (199) a vertical position (240) of the server relative to the other servers within the rack (199) includes receiving (602) from at least one server, by the balance module (191), wire connection information (650) indicating connections from the server to other servers (198) within the rack (199). One or more of the servers may connect to other servers with cables. The cables may have customized lengths and the cable may be aware of the customized length. The cable may also transmit to the server or to the balance module, an indication of the customized length, as wire connection information. The wire connection information may also include server identification information that enables the balance module (191) to determine a vertical arrangement of the servers within the rack. Receiving (602) from at least one server, wire connection information (650) indicating connections from the server to other servers (198) within the rack (199) may be carried out by establishing a connection between the balance module and one or more servers within the rack; and receiving a message from the rack that includes the wire connection information.

In the method of FIG. 6, determining (202) for each server within a rack (199) a vertical position (240) of the server relative to the other servers within the rack (199) includes using (604), by the balance module (191), the wire connection information (650) to calculate a vertical order (652) of the servers (198). Using (604) the wire connection information (650) to calculate a vertical order (652) of the servers (198) may be carried out by comparing the received wire connection information; performing wire triangulation to determine relative location of the servers within the rack or with other racks; creating a list of the servers in an order based on the servers correspondence with the wire triangulation; and storing the list as the vertical order.

In the method of FIG. 6, determining (202) for each server within a rack (199) a vertical position (240) of the server relative to the other servers within the rack (199) includes assigning (606), by the balance module (191), a vertical position for each server based on the calculated vertical order (652) of the servers (198). Assigning (606) a vertical position for each server based on the calculated vertical order (652) of the servers (198) may be carried out by determining for each server, the server's position within the vertical order; and storing the determined position within the vertical order as the determined vertical position of the server.

Figure 7:
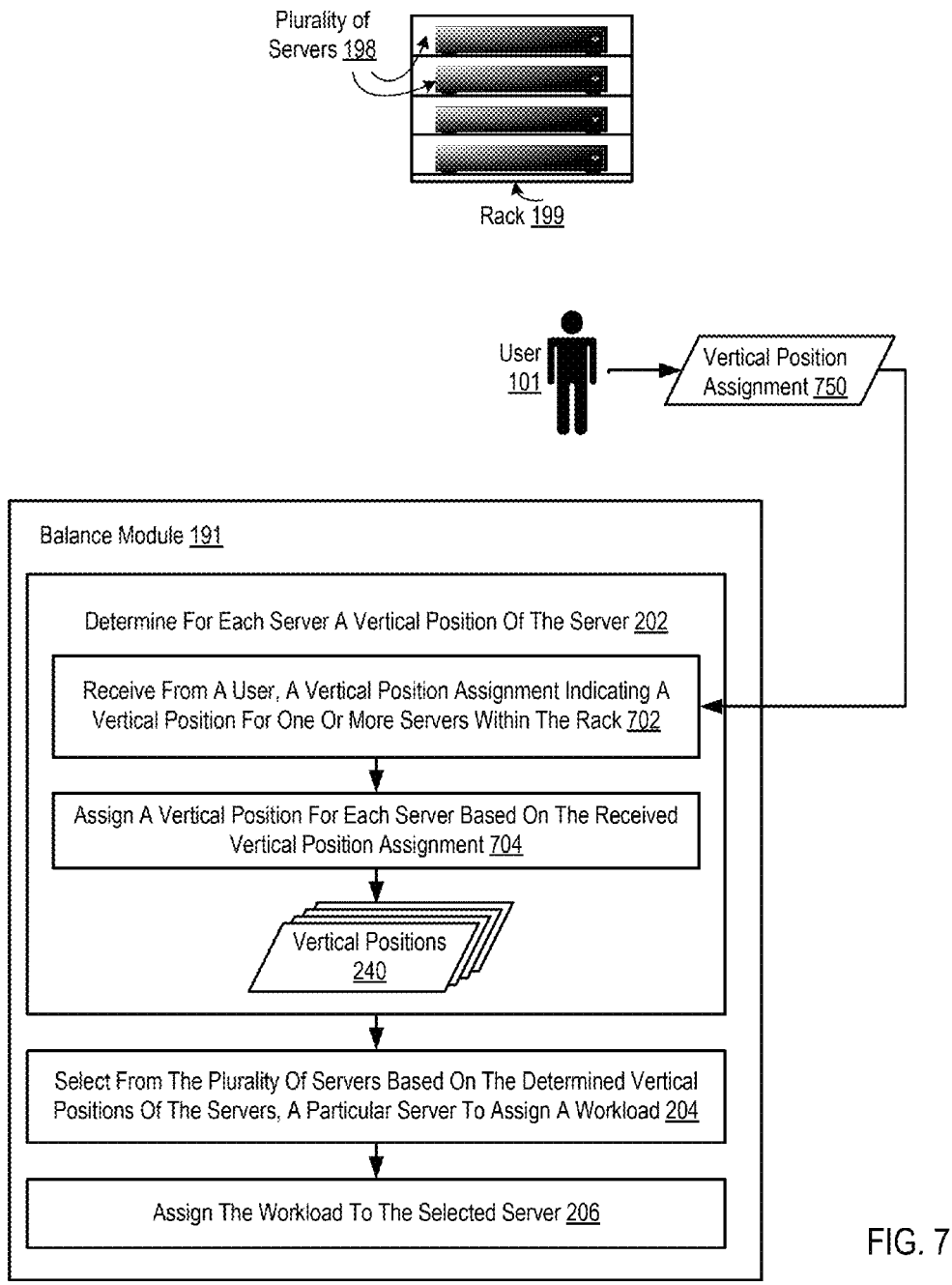
FIG. 7 sets forth a flow chart illustrating a further exemplary method for load balancing servers according to embodiments of the present invention.

For further explanation, FIG. 7 sets forth a flow chart illustrating a further exemplary method for load balancing servers according to embodiments of the present invention. The method of FIG. 7 is similar to the method of FIG. 2 in that the method of FIG. 7 also includes: determining (202) for each server within a rack (199) comprising a plurality of servers (198), a vertical position (240) of the server relative to the other servers within the rack (199); selecting (204) from the plurality of servers (198) based on the determined vertical positions (240) of the servers (198), a particular server (252) to assign a workload (297); and assigning (206) the workload (297) to the selected server (252).

In the method of FIG. 7, however, determining (202) for each server within a rack (199) a vertical position (240) of the server relative to the other servers within the rack (199) includes receiving (702) from a user (101), by the balance module (191), a vertical position assignment (750) indicating a vertical position for one or more servers (198) within the rack (199). A vertical position assignment may be user input that specifically states the order of the servers within the rack. For example, the user may specify that a first server is in a first slot and a second server is in a second slot. As another example, the user can assign a rack position linked with the host name, machine access control (MAC) address, or other static server value. Receiving (702) from a user (101) a vertical position assignment (750) indicating a vertical position for one or more servers (198) within the rack (199) may be carried out by receiving user input; and storing the user input within the balance module.

In the method of FIG. 7, determining (202) for each server within a rack (199) a vertical position (240) of the server relative to the other servers within the rack (199) includes assigning (704), by the balance module (191), a vertical position (240) for each server based on the received vertical position assignment (750). Assigning (704) a vertical position (240) for each server based on the received vertical position assignment (750) may be carried out by corresponding the user input with the balance module's vertical positions. For example, a user may indicate that a first server is in a first slot and consequently, the balance module may assign the first server the first vertical position.

Figure 8:
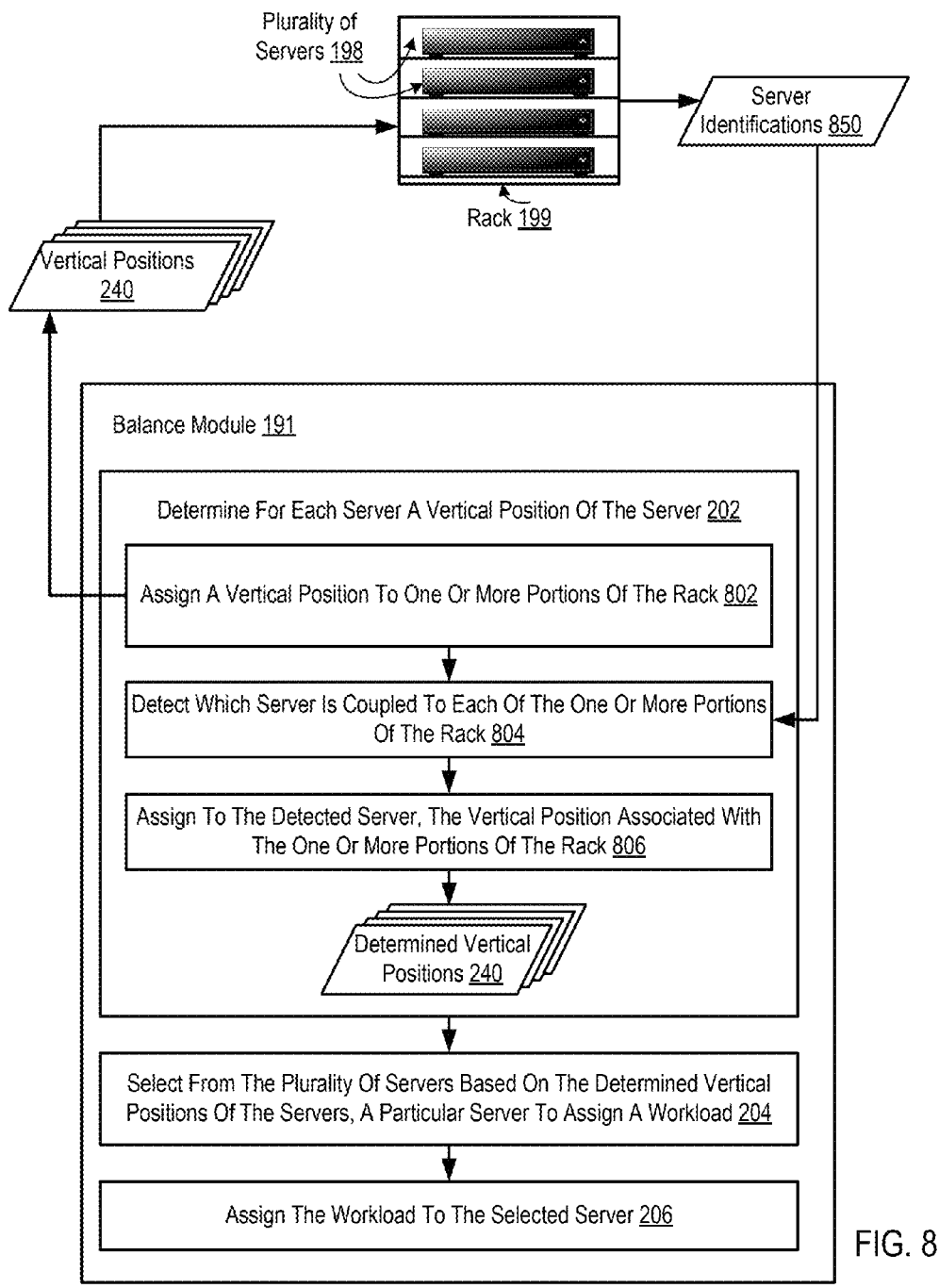
FIG. 8 sets forth a flow chart illustrating a further exemplary method for load balancing servers according to embodiments of the present invention.

For further explanation, FIG. 8 sets forth a flow chart illustrating a further exemplary method for load balancing servers according to embodiments of the present invention. The method of FIG. 8 is similar to the method of FIG. 2 in that the method of FIG. 8 also includes: determining (202) for each server within a rack (199) comprising a plurality of servers (198), a vertical position (240) of the server relative to the other servers within the rack (199); selecting (204) from the plurality of servers (198) based on the determined vertical positions (240) of the servers (198), a particular server (252) to assign a workload (297); and assigning (206) the workload (297) to the selected server (252).

In the method of FIG. 8, however, determining (202) for each server within a rack (199) a vertical position (240) of the server relative to the other servers within the rack (199) includes assigning (802), by the balance module (191), a vertical position (240) to one or more portions of the rack (199). A rack may include structural or hardware components that may be assigned vertical positions. For example, a first slot of a rack may be assigned a first vertical position and a second slot of a rack may be assigned a second vertical position. Assigning (802) a vertical position (240) to one or more portions of the rack (199) may be carried out by storing assignments of the vertical positions of the portions of the rack.

In the method of FIG. 8, determining (202) for each server within a rack (199) a vertical position (240) of the server relative to the other servers within the rack (199) includes detecting (804), by the balance module (191), which server is coupled to each of the one more portions of the rack (199). Detecting (804) which server is coupled to each of the one more portions of the rack (199) may be carried out by receiving for a particular server, a server identification (850) indicating a portion with a rack that the particular server is associated with. For example, the server or the rack may transmit to the balance module indications of servers and the portion of the rack that the server is attached. In this example, a server may transmit a message that indicates the server is within a first slot of the rack.

In the method of FIG. 8, determining (202) for each server within a rack (199) a vertical position (240) of the server relative to the other servers within the rack (199) includes assigning (806) to the detected server, by the balance module (191), the vertical position associated with the one or more portions of the rack (199). Assigning (806) to the detected server the vertical position associated with the one or more portions of the rack (199) may be carried out by corresponding the position associated with the portion of the rack to the particular server.

Figure 9:
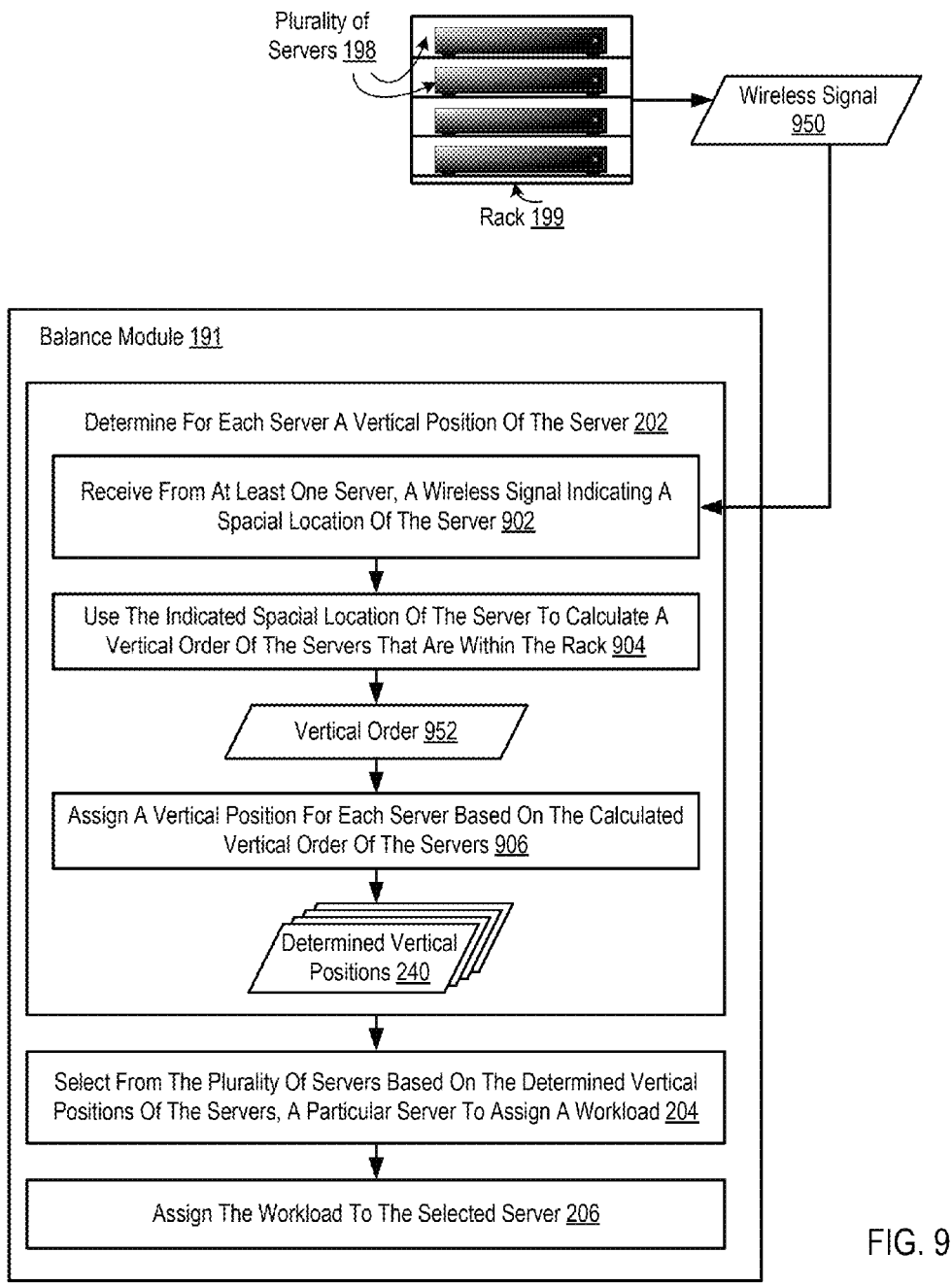
FIG. 9 sets forth a flow chart illustrating a further exemplary method for load balancing servers according to embodiments of the present invention.

For further explanation, FIG. 9 sets forth a flow chart illustrating a further exemplary method for load balancing servers according to embodiments of the present invention. The method of FIG. 9 is similar to the method of FIG. 2 in that the method of FIG. 9 also includes: determining (202) for each server within a rack (199) comprising a plurality of servers (198), a vertical position (240) of the server relative to the other servers within the rack (199); selecting (204) from the plurality of servers (198) based on the determined vertical positions (240) of the servers (198), a particular server (252) to assign a workload (297); and assigning (206) the workload (297) to the selected server (252).

In the method of FIG. 9, however, determining (202) for each server within a rack (199) a vertical position (240) of the server relative to the other servers within the rack (199) includes receiving (902) from at least one server, by the balance module (191), a wireless signal (950) indicating a spatial location of the server. A wireless signal may include magnetic or radio frequency signal that can be used to determine a spatial location of the server. Receiving (902) from at least one server a wireless signal (950) indicating a spatial location of the server may be carried out by receiving an radio frequency identification (RFID) or a magnetic signal that can be used to determine a location.

In the method of FIG. 9, determining (202) for each server within a rack (199) a vertical position (240) of the server relative to the other servers within the rack (199) includes using (904), by the balance module (191), the received wireless signal (950) indicating the spatial location of the server to calculate a vertical order (952) of the servers (198) within the rack (199). Using (904) the received wireless signal (950) indicating the spatial location of the server to calculate a vertical order (952) of the servers (198) within the rack (199) may be carried out by comparing the received spatial locations of the servers; sorting the received spatial locations based on height from a shared reference point, such as the ground or other servers; creating a list of the servers in an order based on the servers correspondence with the sorted spatial locations; and storing the list as the vertical order.

In the method of FIG. 9, determining (202) for each server within a rack (199) a vertical position (240) of the server relative to the other servers within the rack (199) includes assigning (906), by the balance module (191), a vertical position (240) for each server based on the calculated vertical order (952) of the servers (198). Assigning (906) a vertical position for each server based on the calculated vertical order (952) of the servers (198) may be carried out by determining for each server, the server's position within the vertical order; and storing the determined position within the vertical order as the determined vertical position of the server.

Figure 10:
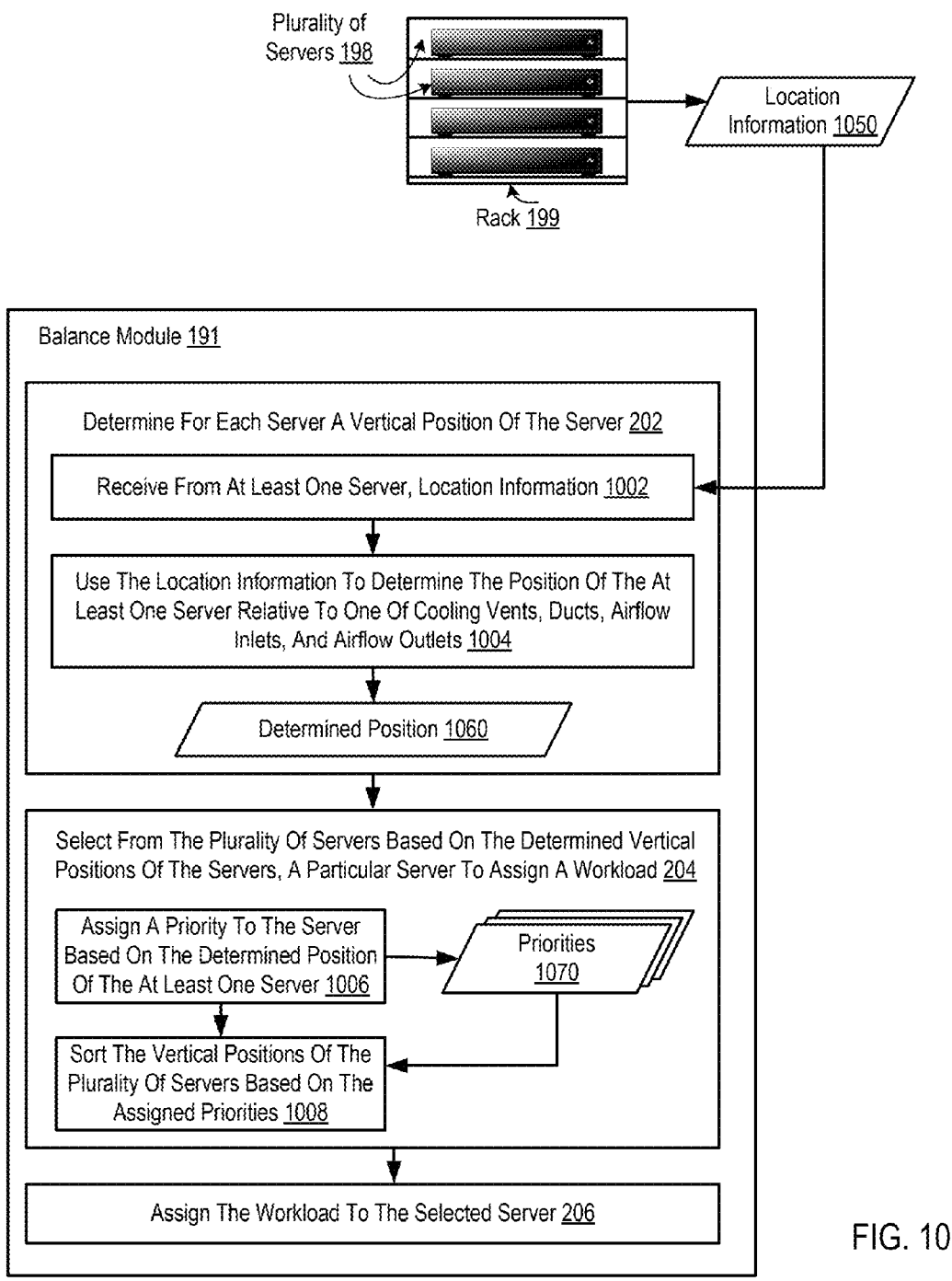
FIG. 10 sets forth a flow chart illustrating a further exemplary method for load balancing servers according to embodiments of the present invention.

For further explanation, FIG. 10 sets forth a flow chart illustrating a further exemplary method for load balancing servers according to embodiments of the present invention. The method of FIG. 10 is similar to the method of FIG. 2 in that the method of FIG. 10 also includes: determining (202) for each server within a rack (199) comprising a plurality of servers (198), a vertical position (240) of the server relative to the other servers within the rack (199); selecting (204) from the plurality of servers (198) based on the determined vertical positions (240) of the servers (198), a particular server (252) to assign a workload (297); and assigning (206) the workload (297) to the selected server (252).

In the method of FIG. 10, however, determining (202) for each server within a rack (199) a vertical position (240) of the server relative to the other servers within the rack (199) includes receiving (1002) from at least one server, by the balance module (191), location information (1050). Location information may include information indicating the server's position in a rack, cluster of racks, or position in data center. Receiving (1002) from at least one server, location information (1050) may be carried out by receiving a message from the at least one server that includes the location information.

In the method of FIG. 10, determining (202) for each server within a rack (199) a vertical position (240) of the server relative to the other servers within the rack (199) includes using (1004), by the balance module (191), the location information (1050) to determine the position (1060) of the at least one server relative to one of cooling vents, ducts, airflow inlets, and airflow outlets. A data center may include vents, ducts, airflow inlets, and airflow outlets that are used to cool servers. Using (1004) the location information (1050) to determine the position (1060) of the at least one server relative to one of cooling vents, ducts, airflow inlets, and airflow outlets may be carried out by comparing the predetermined locations of cooling vents, ducts, airflow inlets, and airflow outlets within a data center to the positions of the servers to determine which servers will be cooled the most or have the most effective cooling access.

In the method of FIG. 10, selecting (204) from the plurality of servers (198) based on the determined vertical positions (240) of the servers (198), a particular server (252) to assign a workload (297) includes assigning (1006), by the balance module (191), a priority (1070) to the server based on the determined position (1060) of the at least one server relative to one of cooling vents, ducts, airflow inlets, and airflow outlets. Assigning (1006) a priority (1070) to the server based on the determined position (1060) of the at least one server relative to one of cooling vents, ducts, airflow inlets, and airflow outlets may be carried out by using an algorithm to determine priorities based on vertical positions of servers within racks and proximity of the servers to cooling elements, such as cooling vents, ducts, airflow inlets, and airflow outlets. That is, the availability and proximity of cooling resources of a data center may further impact which servers are selected for performing a workload.

In the method of FIG. 10, selecting (204) from the plurality of servers (198) based on the determined vertical positions (240) of the servers (198), a particular server (252) to assign a workload (297) includes sorting (1008), by the balance module (191), the vertical positions (198) of the plurality of servers (198) based on assigned priorities (1070). Sorting (1008) the vertical positions (198) of the plurality of servers (198) based on assigned priorities (1070) may be carried out by creating a list of servers based on priority where the servers with the highest priority are assigned the workload before lower priority servers. For example, a first server on the bottom position of a first rack that is not near a cooling vent may be assigned a lower priority than a second server on the bottom position of a second rack that is near a cooling vent. In this case, because of the second server's proximity to the cooling vent, it is easier to cool the second server than the first server. As another example, a third server on the bottom position of a third rack that is not near a cooling vent may be assigned a lower priority than a fourth server on the second to bottom position of a fourth rack that is near a cooling vent. In this example, the proximity of the fourth server to the cooling vent is given more weight in priority determination than the vertical position of the servers within racks. In addition, this example also illustrates that the balance module (191) may be configured to balance workloads on multiple racks or clusters of racks. That is, the balance module may compare the vertical positions of servers from multiple racks to determine the optimal server to assign the workload. In this example, the optimal server to assign the workload may be an available server with the lowest vertical position among a plurality of racks and best access to cooling resources of a data center.

Exemplary embodiments of the present invention are described largely in the context of a fully functional computer system for load balancing servers. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, spatial purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by spatial purpose hardware-based systems that perform the specified functions or acts, or combinations of spatial purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for load balancing servers, the method comprising:
   determining, by a balance module, for each server within a rack comprising a plurality of servers, a vertical position of the server relative to the other servers within the rack, including:
      receiving from at least one server location information; and
      using the location information to determine the position of the at least one server relative to one of cooling vents, ducts, airflow inlets, and airflow outlets;
   selecting from the plurality of servers, by the balance module, based on the determined vertical positions of the plurality of servers, a particular server to assign a workload, including:
      assigning a priority to the plurality of server based on the determined position of the at least one server relative to one of cooling vents, ducts, airflow inlets, and airflow outlets; and
      sorting the vertical positions of the plurality of servers based on assigned priorities; and
   assigning, by the balance module, the workload to the selected server.

2. The method of claim 1 wherein determining the vertical position of the server relative to the other servers within the rack includes:
   receiving from each server, by the balance module, an altimeter reading indicating a vertical height of the server;
   calculating, by the balance module, a vertical order of the plurality of servers based on the received altimeter readings; and
   assigning, by the balance module, a vertical position for each server based on the calculated vertical order of the plurality of servers.

3. The method of claim 1 wherein determining the vertical position of the server relative to the other servers within the rack includes:
   receiving from each server, by the balance module, a laser distance measurement indicating a vertical height of the server;
   calculating, by the balance module, a vertical order of the plurality of servers based on the received laser distance measurements; and
   assigning, by the balance module, a vertical position for each server based on the calculated vertical order of the plurality of servers.

4. The method of claim 1 wherein determining the vertical position of the server relative to the other servers within the rack includes:
   receiving from at least one server, by the balance module, a picture corresponding to the front of the server;
   identifying, by the balance module, within the picture, one or more of the other servers that are within the rack;
   using, by the balance module, the identification of the servers within the picture to calculate a vertical order of the one or more other servers that are within the rack and the at least one server; and
   assigning, by the balance module, a vertical position for each of the one or more other servers and the at least one server based on the calculated vertical order.

5. The method of claim 1 wherein determining the vertical position of the server relative to the other servers within the rack includes:
   receiving from at least one server, by the balance module, wire connection information indicating connections from the server to other servers within the rack;
   using, by the balance module, the wire connection information to calculate a vertical order of the plurality of servers; and
   assigning, by the balance module, a vertical position for each server based on the calculated vertical order of the plurality of servers.

6. The method of claim 1 wherein determining the vertical position of the server relative to the other servers within the rack includes:
   receiving from a user, by the balance module, a vertical position assignment indicating a vertical position for one or more servers within the rack; and
   assigning, by the balance module, a vertical position for each server based on the received vertical position assignment.

7. The method of claim 1 wherein determining the vertical position of the server relative to the other servers within the rack includes:
   assigning, by the balance module, a vertical position to one or more portions of the rack;

detecting, by the balance module, which server is coupled to each of the one more portions of the rack;

assigning to the detected server, by the balance module, the vertical position associated with the one or more portions of the rack.

8. The method of claim 1 wherein determining the vertical position of the server relative to the other servers within the rack includes:

receiving from at least one server, by the balance module, a wireless signal indicating a spatial location of the server;

using, by the balance module, the received wireless signal indicating the spatial location of the server to calculate a vertical order of the plurality servers within the rack; and assigning, by the balance module, a vertical position for each server based on the calculated vertical order of the plurality of servers.

9. An apparatus for load balancing servers, the apparatus comprising a computer processor, a computer memory operatively coupled to the computer processor, the computer memory having disposed within it computer program instructions capable of that when executed by the computer processor cause the apparatus to carry out the steps of:

determining, by a balance module, for each server within a rack comprising a plurality of servers, a vertical position of the server relative to the other servers within the rack, including:

receiving from at least one server location information; and using the location information to determine the position of the at least one server relative to one of cooling vents, ducts, airflow inlets, and airflow outlets;

selecting from the plurality of servers, by the balance module, based on the determined vertical positions of the plurality of servers, a particular server to assign a workload, including:

assigning a priority to the plurality of server based on the determined position of the at least one server relative to one of cooling vents, ducts, airflow inlets, and airflow outlets; and sorting the vertical positions of the plurality of servers based on assigned priorities; and assigning, by the balance module, the workload to the selected server.

10. The apparatus of claim 9 wherein determining the vertical position of the server relative to the other servers within the rack includes:

receiving from each server, by the balance module, an altimeter reading indicating a vertical height of the server;

calculating, by the balance module, a vertical order of the plurality of servers based on the received altimeter readings; and assigning, by the balance module, a vertical position for each server based on the calculated vertical order of the plurality of servers.

11. The apparatus of claim 9 wherein determining the vertical position of the server relative to the other servers within the rack includes:

receiving from each server, by the balance module, a laser distance measurement indicating a vertical height of the server;

calculating, by the balance module, a vertical order of the plurality of servers based on the received laser distance measurements; and assigning, by the balance module, a vertical position for each server based on the calculated vertical order of the plurality of servers.

12. The apparatus of claim 9 wherein determining the vertical position of the server relative to the other servers within the rack includes:

receiving from at least one server, by the balance module, a picture corresponding to the front of the server;

identifying, by the balance module, within the picture, one or more of the other servers that are within the rack;

using, by the balance module, the identification of the servers within the picture to calculate a vertical order of the one or more other servers that are within the rack and the at least one server; and assigning, by the balance module, a vertical position for each of the one or more other servers and the at least one server based on the calculated vertical order.

13. The apparatus of claim 9 wherein determining the vertical position of the server relative to the other servers within the rack includes:

receiving from at least one server, by the balance module, wire connection information indicating connections from the server to other servers within the rack;

using, by the balance module, the wire connection information to calculate a vertical order of the plurality of servers; and assigning, by the balance module, a vertical position for each server based on the calculated vertical order of the plurality of servers.

14. A computer program product for load balancing servers, the computer program product disposed upon a computer readable medium, wherein the computer readable medium is not a signal and the computer program product comprises computer program instructions capable, when executed, of causing a computer to carry out the steps of:

determining, by a balance module, for each server within a rack comprising a plurality of servers, a vertical position of the server relative to the other servers within the rack, including:

receiving from at least one server location information; and using the location information to determine the position of the at least one server relative to one of cooling vents, ducts, airflow inlets, and airflow outlets;

selecting from the plurality of servers, by the balance module, based on the determined vertical positions of the plurality of servers, a particular server to assign a workload, including:

assigning a priority to the plurality of server based on the determined position of the at least one server relative to one of cooling vents, ducts, airflow inlets, and airflow outlets; and sorting the vertical positions of the plurality of servers based on assigned priorities; and assigning, by the balance module, the workload to the selected server.

15. The computer program product of claim 14 wherein determining the vertical position of the server relative to the other servers within the rack includes:

receiving from each server, by the balance module, an altimeter reading indicating a vertical height of the server;

calculating, by the balance module, a vertical order of the plurality of servers based on the received altimeter readings; and assigning, by the balance module, a vertical position for each server based on the calculated vertical order of the plurality of servers.

16. The computer program product of claim 14 wherein determining the vertical position of the server relative to the other servers within the rack includes:
 receiving from each server, by the balance module, a laser distance measurement indicating a vertical height of the server;
 calculating, by the balance module, a vertical order of the servers based on the received laser distance measurements; and
 assigning, by the balance module, a vertical position for each server based on the calculated vertical order of the servers.

17. The computer program product of claim 14 wherein determining the vertical position of the server relative to the other servers within the rack includes:
 receiving from at least one server, by the balance module, a picture corresponding to the front of the server;
 identifying, by the balance module, within the picture, one or more of the other servers that are within the rack;
 using, by the balance module, the identification of the one or more other servers within the picture to calculate a vertical order of the plurality of servers that are within the rack; and
 assigning, by the balance module, a vertical position for each server based on the calculated vertical order of the plurality of servers.

18. The computer program product of claim 14 wherein determining the vertical position of the server relative to the other servers within the rack includes:
 receiving from at least one server, by the balance module, wire connection information indicating connections from the server to other servers within the rack;
 using, by the balance module, the wire connection information to calculate a vertical order of the servers; and
 assigning, by the balance module, a vertical position for each server based on the calculated vertical order of the servers.

* * * * *